(12) United States Patent
Kelley et al.

(10) Patent No.: US 7,634,223 B2
(45) Date of Patent: Dec. 15, 2009

(54) METHOD AND APPARATUS FOR CONTROLLING A DELIVERY OF A BROADCAST-MULTICAST FLOW IN A PACKET DATA COMMUNICATION SYSTEM

(75) Inventors: Sean S. Kelley, Barrington, IL (US); Valentin Oprescu-Surcobe, Northbrook, IL (US); Senaka Balasuriya, Arlington Heights, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 11/152,648

(22) Filed: Jun. 14, 2005

(65) Prior Publication Data

US 2006/0009247 A1    Jan. 12, 2006

Related U.S. Application Data

(60) Provisional application No. 60/587,241, filed on Jul. 12, 2004.

(51) Int. Cl.
*H04W 12/04* (2006.01)
*H04H 20/71* (2008.01)
*H04H 60/11* (2008.01)

(52) U.S. Cl. ............... 455/3.01; 455/3.03; 455/411; 455/517; 713/163

(58) Field of Classification Search ............ 455/3.01, 455/3.03, 410, 411, 517, 503; 380/200; 713/163
See application file for complete search history.

(56) References Cited

U.S. PATENT DOCUMENTS

| 6,880,081 | B1 * | 4/2005 | Itkis ............... 713/163 |
| 2004/0120527 | A1 | 6/2004 | Hawkes et al. |
| 2004/0240668 | A1 * | 12/2004 | Bonan et al. ........ 380/200 |

FOREIGN PATENT DOCUMENTS

GB    2394629 A    4/2004

* cited by examiner

*Primary Examiner*—Philip J Sobutka
(74) *Attorney, Agent, or Firm*—Steven A. May

(57) ABSTRACT

A communication system provides separate subscription keys for a non-subscriber version of a broadcast-multicast flow and a subscriber-only version of the flow, thereby controlling who may store or render the flow. In one embodiment, separate subscription keys may be assigned to a same broadcast-multicast flow. The communication system may then switch the keys used to encrypt the flow, or may use different keys to encrypt different copies of the flow, in order to allow at least non-subscribers to view one version of the flow and only subscribers to view another version of the flow. In another embodiment, the communication system may assign a group subscription key to a group of broadcast-multicast flows that is separate from the keys assigned to each individual flow. The group subscription key may then be used to encrypt a non-subscriber version of any broadcast-multicast flow in the group of broadcast-multicast flows.

22 Claims, 4 Drawing Sheets

US 7,634,223 B2

METHOD AND APPARATUS FOR CONTROLLING A DELIVERY OF A BROADCAST-MULTICAST FLOW IN A PACKET DATA COMMUNICATION SYSTEM

CROSS-REFERENCE(S) TO RELATED APPLICATION(S)

The present application claims priority from provisional application Ser. No. 60/587,241, entitled "METHOD AND APPARATUS FOR CONTROLLING A DELIVERY OF A BROADCAST-MULTICAST FLOW IN A PACKET DATA COMMUNICATION SYSTEM," filed Jul. 12, 2004, which is commonly owned and incorporated herein by reference in its entirety.

FIELD OF THE INVENTION

The present invention relates generally to packet data communication systems and, in particular, to delivery of a Broadcast-Multicast Service (BCMCS) or a Multimedia Broadcast/Multicast Service (MBMS) in a packet data communication system.

BACKGROUND OF THE INVENTION

The Third Generation Partnership Project Two (3GPP2) standard provides a compatibility standard for cellular mobile telecommunications systems. The 3GPP2 standard ensures that a mobile station (MS), or access terminal (AT), (hereinafter collectively referred to as an MS) operating in a cdma2000 (Code Division Multiple Access 2000) communication system (such as a 1X system or a HRPD system) can obtain communication services when operating in a system manufactured according to the standards. To ensure compatibility, radio system parameters and data transfer procedures are specified by the standards, including protocols governing digital control messages and bearer traffic that are exchanged over an air interface.

The 3GPP2 standards provide, in the X.P0022, A.S0019, C.S0054, C.S0005, and S.R0083 specifications, for delivery of a Broadcast-Multicast Service (BCMCS) by a cdma2000 communication system to MSs serviced by the system and subscribed to the Service. For example, a BCMCS may deliver one or more broadcast-multicast flows comprising audio, video, and/or data associated with a multimedia program such as a Cable News Network (CNN) newscast or an Home Box Office (HBO) movie or show.

In order to permit an MS subscribed to a broadcast-multicast flow associated with a BCMCS to receive and store and/or render the content of the flow, a BCMCS Controller conveys to the MS a flow identifier (BCMCS_FLOW_ID) associated with the flow, that is, with the particular program, such as CNN or HBO, subscribed to by the MS, a Broadcast Access Key (BAK) used to encrypt/decrypt the audio, video, and/or data associated with the flow, a BAK identifier (BAK_ID) that identifies the associated BAK, and an expiration time (BAK_Expire) at which the associated BAK expires (at which time a new BAK is employed). The BAK serves to protect the content of the flow from viewing by non-subscribers to the flow. The BCMCS Controller may further convey to the subscribed MS an identifier of an algorithm, such as MPEG4, used to compress data associated with the flow, and miscellaneous program-related information, such as a program date and a program start time or stop time. When a BCMCS Content Server associated with the BCMCS Controller receives BCMCS data associated with the flow, the BCMCS Controller instructs the BCMCS Content Server to encrypt the data using the BAK. The BCMCS Content Server then broadcasts the encrypted data via a Base Station (BS) or an Access Network (AN) servicing the MS. Each subscribed MS may then decrypt the broadcast audio, video, and/or data using the provided subscription key and store, and/or render to the user of the MS, the decrypted audio, video, and/or data.

In a communication system that provides a BCMCS, it is desirable to permit MSs serviced by the system to preview content of the broadcast-multicast flows associated with the BCMCS in order to entice the MSs, that is, users of the MSs, to subscribe to the flows. In order to permit an MS to preview content of a broadcast-multicast flow, the BAK used to encrypt the flow must be provided to the MS. However, providing the BAK to the MS amounts to giving away a free subscription to the broadcast-multicast flow until the BAK expires. In order to minimize the impact of the give away, the life of the BAK may be shortened, but the shorter the life of the BAK, the more complex the key management and the more system overhead is consumed in repeatedly conveying keys to MSs subscribed to the flow. Alternatively, previews may be broadcast unencrypted, but this may allow all MSs active in the communication system to view the content of the broadcast-multicast flow, including under-age users with respect to flows with adult content. Furthermore, a broadcast of an unencrypted preview may not allow a system operator to restrict a preview, such as a preview of a pay-per-view HBO broadcast, to a limited subscriber audience, such as only subscribers to HBO programming.

Therefore, a need exists for a method and apparatus for controlling a delivery of previews of broadcast-multicast flows in a packet data communication system.

DETAILED DESCRIPTION OF THE INVENTION

Figure 1:
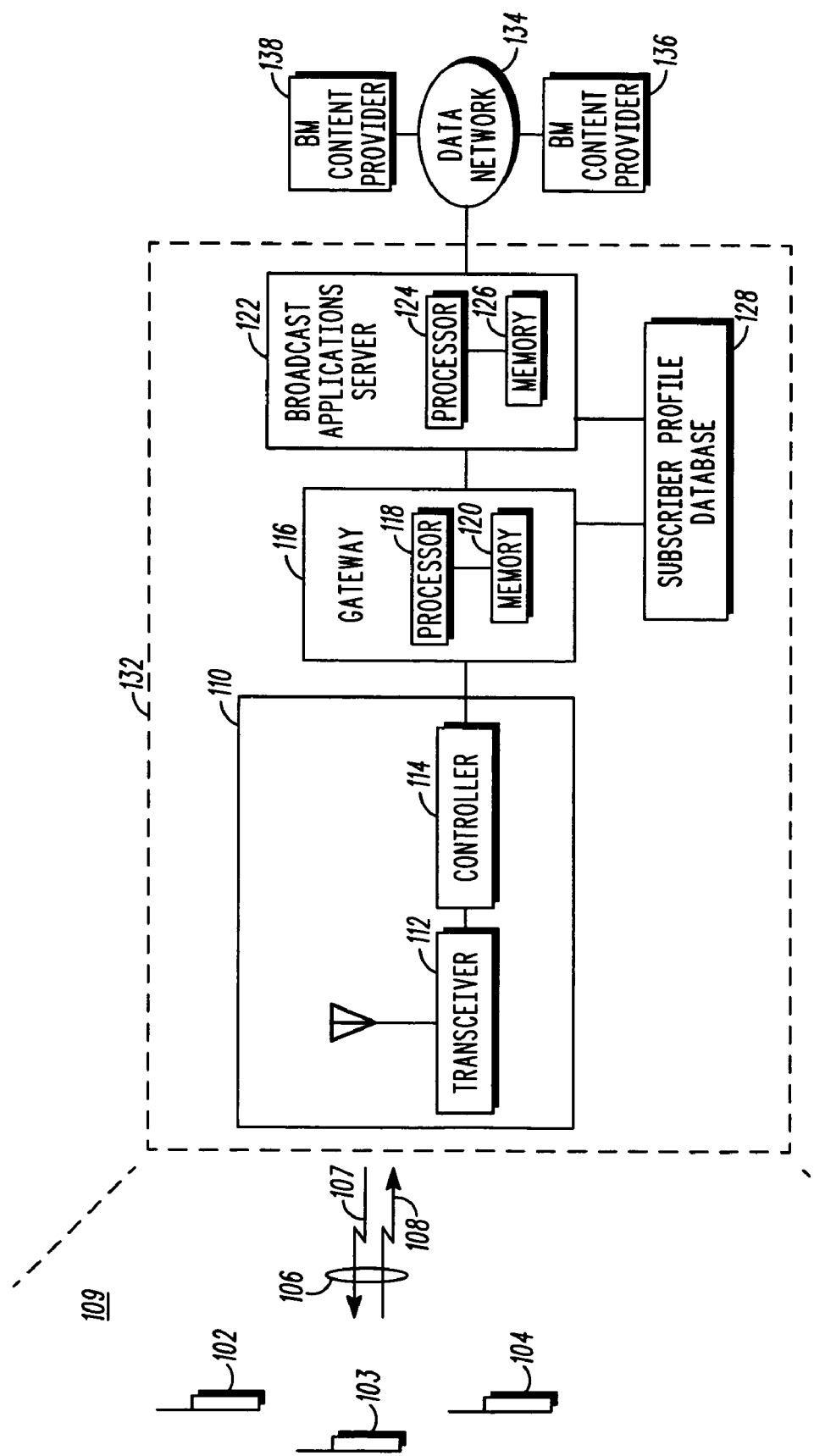
FIG. 1 is a block diagram of a wireless communication system in accordance with an embodiment of the present invention.

To address the need for a method and an apparatus for controlling a provision of previews of broadcast-multicast flows in a packet data communication system, a communication system provides separate subscription keys for a non-subscriber version of a broadcast-multicast flow and a subscriber-only version of the flow, thereby controlling who may store or render the flow. In one embodiment of the present invention, separate subscription keys may be assigned to a same broadcast-multicast flow. The communication system may then switch the keys used to encrypt the flow, or may use different keys to encrypt different copies of the flow, in order to allow at least non-subscribers to view one version of the flow and only subscribers to view another version of the flow. In another embodiment of the present invention, the communication system may assign a group subscription key to a group of broadcast-multicast flows that is separate from the keys assigned to each individual flow. The group subscription key may then be used to encrypt a non-subscriber version of any broadcast-multicast flow in the group of broadcast-multicast flows.

Generally, an embodiment of the present invention encompasses a method for distributing subscription keys associated with a broadcast-multicast flow. The method includes conveying a first at least one subscription key associated with a broadcast-multicast flow to a first set of mobile stations and conveying a second at least one subscription key associated with the broadcast-multicast flow to a second set of mobile stations, wherein the second at least one subscription key is different than the first at least one subscription key and the second set of mobile stations is different than the first set of mobile stations.

Another embodiment of the present invention encompasses a method for providing a broadcast-multicast service. The method includes receiving an encrypted subscriber-only broadcast-multicast flow, receiving an encrypted non-subscriber version of the broadcast-multicast flow, receiving at least one subscription key associated with the non-subscriber version of the broadcast-multicast flow, and decrypting the encrypted non-subscriber version of the broadcast-multicast flow using the at least one subscription key, wherein the at least one subscription key cannot be used to decrypt the encrypted subscriber-only version of the broadcast-multicast flow.

Yet another embodiment of the present invention encompasses a broadcast applications server that includes at least one memory device that maintains a first at least one subscription key and a second at least one subscription key in association with a broadcast-multicast flow, wherein the first at least one subscription key is used to encrypt a subscriber-only version of the broadcast-multicast flow and the second at least one subscription key is used to encrypt a non-subscriber version of the broadcast-multicast flow.

Still another embodiment of the present invention encompasses a mobile station that includes a processor that receives an encrypted non-subscriber version of a broadcast-multicast flow, receives at least one subscription key associated with the non-subscriber version of the broadcast-multicast flow, decrypts the encrypted non-subscriber version of the broadcast-multicast flow using the at least one subscription key to produce a decrypted non-subscriber version of the broadcast-multicast flow, and renders the decrypted non-subscriber version of the broadcast-multicast flow, wherein the at least one subscription key cannot be used to decrypt an encrypted subscriber-only version of the broadcast-multicast flow.

Yet another embodiment of the present invention encompasses a method for providing a broadcast-multicast service. The method includes storing a first at least one subscription key and a second at least one subscription key. The method further includes receiving a non-subscriber version of the broadcast-multicast flow encrypted by the second at least one subscription key and decrypting the encrypted non-subscriber version of the broadcast-multicast flow using the second at least one subscription key. The method further includes receiving a subscriber-only version of a broadcast-multicast flow encrypted by the first at least one subscription key and decrypting the encrypted subscriber-only version of the broadcast-multicast flow using the first at least one subscription key.

The present invention may be more fully described with reference to FIGS. 1-5. FIG. 1 is a block diagram of a wireless communication system 100 in accordance with an embodiment of the present invention. Communication system 100 includes at least one Base Station (BS), Access Network (AN), or Radio Access Network (RAN) (hereinafter collectively referred to as a BS) 110. BS 110 includes at least one transceiver 112, such as a Base Transceiver Station (BTS), an Access Point (AP), or a Node B, that is operationally coupled to a network controller 114, such as a Base Station Controller (BSC), a Radio Network Controller (RNC), or a Packet Control Function (PCF). BS 110 provides communications services to mobile communication devices, such as mobile stations (MSs), Access Terminals (ATs), or User Equipment (UEs) located in a coverage area 109, such as a cell or sector, serviced by the BS via an air interface 106. Air interface 106 comprises a downlink 107 and an uplink 108 that each includes multiple radio frequency (RF) resources, that is, RF communication channels. Downlink 107 preferably includes a paging channel, at least one downlink pilot channel, at least one downlink control channel, and at least one downlink bearer channel. Uplink 108 preferably includes an uplink access channel and at least one uplink control channel. In general, and unrelated to broadcast, the uplink may further include at least one uplink bearer channel.

Communication system 100 further includes multiple mobile stations (MSs), access terminals (ATs), or user equipment (UEs), 102-104 (three shown) (hereinafter collectively referred to as MSs) that reside in coverage area 109 of BS 110 and that are serviced by the BS. One of ordinary skill in the art realizes that each MS 102-104 may be any of, but not limited to, a cellular telephone, a radio telephone, a personal digital assistant (PDA) with radio frequency (RF) capabilities, or a wireless modem that provides an RF interface for digital terminal equipment (DTE) such as a laptop computer. Each MS 102-104 is capable of receiving and displaying audio, video, and/or data associated with a broadcast-multicast service provided by communication system 100, which service provides for a distribution of broadcast-multicast service data to MSs subscribed to the broadcast-multicast service.

Communication system 100 further includes a gateway 116, such as a Packet Data Serving Node (PDSN), and/or a Broadcast Serving Node (BSN), or a Serving GPRS Support Node (SGSN) and a Gateway GPRS Support Node, that is operationally coupled to BS 110, a broadcast application server 122, such as a Broadcast-Multicast Service (BCMCS) Controller and/or a BCMCS Content Server, or a Broadcast Multicast Service Center (BM-SC) and possibly other servers such as a User Support Server, in communication with network controller 114, and a subscriber profile database 128 that is operationally coupled to each of the broadcast applications server and the gateway. In various embodiments of the present invention, subscriber profile database 128 may reside in an Authentication, Authorization, Accounting entity (AAA) (not shown), a Home Location Register (HLR) (not shown), or a Home Subscriber Server (HSS) (not shown), may be distributed among them, or may be an entity separate from them. Each of BS 110, gateway 116, broadcast applications server 122, and subscriber profile database 128 comprises a network element of a wireless network 132.

Communication system 100 further includes multiple broadcast-multicast (BM) content providers 136, 138 (two shown). Each BM content provider 136, 138 is coupled to wireless network 132, and in particular to server 122, via a data network 134. As part of a broadcast-multicast service provided by communication system 100 and that may be subscribed to by each MS 102-104, each BM content provider 136, 138 sources broadcast-multicast service data to subscribed MSs, such as MSs 102-104, via server 122, gateway 116, and BS 110.

Communication system 100 provides a broadcast-multicast service capable of delivering multiple broadcast-multicast flows to MSs, such as MSs 102-104, capable of broadcast-multicast reception. For example, a broadcast-multicast flow may comprise a broadcast of audio, video, and/or data associated with a multimedia program, such as a Cable News Network (CNN) newscast, a Home Box Office (HBO) show, or a sporting event, such as a soccer game or a baseball game. Preferably, communication system 100 is a Code Division Multiple Access (CDMA) 2000 communication system that operates in accordance with the 3GPP2 (Third Generation Partnership Project 2) standards. The 3GPP2 standards provide a compatibility standard for CDMA 2000 air interfaces (both 1X and HRPD) and specify wireless telecommunications system operating protocols, including radio system parameters, call processing procedures, and provision of a broadcast-multicast service, that is, a Broadcast-Multicast Service (BCMCS). BCMCSs are described in detail in the 3GPP2 (Third Generation Partnership Project Two) X.P0022, A.S00019, C.S0054, C.S0005 and S.R0083 specifications, which specifications are hereby incorporated herein in their entirety and copies of which may be obtained from the 3GPP2 via the Internet or from the 3GPP2 Secretariat with administrative offices at 2500 Wilson Boulevard, Suite 300, Arlington, Va. 22201 (USA).

In another embodiment of the present invention, communication system 100 may be a Universal Mobile Telecommunication Service (UMTS) or a GPRS communication system that operates in accordance with the 3GPP (Third Generation Partnership Project) standards. The 3GPP standards also specify wireless telecommunications system operating protocols and further specify delivery of a broadcast-multicast service, that is, a Multimedia Broadcast/Multicast Service (MBMS), in 3GPP (Third Generation Partnership Project) TS (Technical Specification) 23.246, TS 22.146, TS 25.346, and TS 29.846, which specifications are hereby incorporated herein in their entirety. In yet other embodiments of the present invention, communication system 100 may operate in accordance with any other wireless telecommunication system, such as but not limited to a Time Division Multiple Access (TDMA) communication system, or an Orthogonal Frequency Division Multiple Access (OFDM) communication system.

Broadcast applications server 122 provides a central point for a distribution, to subscribed MSs, of the multiple broadcast-multicast flows associated with the broadcast-multicast service provided by communication system 100. When broadcast application server 122 receives data associated with a broadcast-multicast flow from a BM content provider 136, 138, the broadcast applications server conveys the data to each subscribed MS, such as MSs 102-104, via a BS servicing the MS, that is, BS 110, which BS transmits the data by broadcasting or multicasting the data via a bearer channel of an associated air interface downlink, that is, downlink 107. Prior to conveying the data, broadcast applications server 122 may have the data encrypted using a subscription key, such as a BAK, distributed to the subscribed MSs. Each subscribed MS may then decrypt the broadcast audio, video, and/or data using the provided key and render the audio, video, and/or data to the user of the MS via user interface 210.

Figure 2:
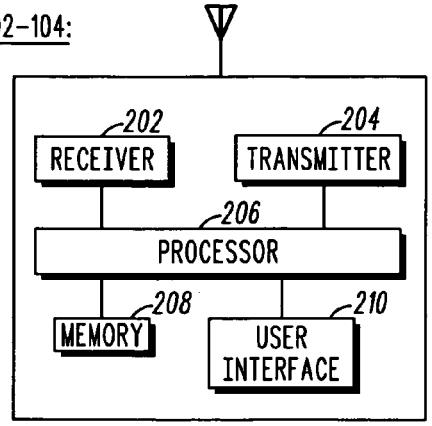
FIG. 2 is a block diagram of a mobile station of FIG. 1 in accordance with an embodiment of the present invention.

Referring now to FIGS. 1 and 2, each of MSs 102-104, gateway 116, and server 122 includes a respective processor 206, 118, 124, such as one or more microprocessors, microcontrollers, digital signal processors (DSPs), combinations thereof or such other devices known to those having ordinary skill in the art. Each of MSs 102-104, gateway 116, and server 122 further includes a respective at least one memory device 208, 120, 126 associated with the respective processor, such as random access memory (RAM), dynamic random access memory (DRAM), and/or read only memory (ROM) or equivalents thereof, that store an identifier associated with the MS, gateway, or server, such as statically or dynamically assigned identifier or a statically or dynamically assigned routing address, such as an IP (Internet Protocol) address, and other data and programs that may be executed by the processor and allow the processor to operate in communication system 100. Each MS 102-104 further includes a receiver 202 and a transmitter 204 that are operationally coupled to processor 206 and that respectively provide for receiving and transmitting messages by the MS. Unless otherwise specified herein, all functions described as being performed herein by an MS 102-104, gateway, 116, or server 122 are performed by the respective processor 206, 118, and 124 of the MS, gateway, and server.

At least one memory device 126 of server 122 further maintains one or more identifiers associated with each broadcast-multicast flow provided by the server, for example, a flow identifier (for example, BCMCS_FLOW_ID) associated with the flow, that is, with the particular program, such as CNN or HBO, associated with the flow, and one or more subscription keys that are associated with the flow and that are used to encrypt and decrypt the flow. For example, in a 3GPP2 communication system, a subscription key comprises a Broadcast Access Key (BAK), which is associated with the flow identifier (BCMCS_FLOW_ID) and identified by a BAK identifier (BAK_ID) and which expires at an associated expiration time (BAK_Expire), which BAK, BAK_ID, and BAK_Expire are each maintained in association with a broadcast-multicast flow in at least one memory device 126. At least one memory device 126 of server 122 may further maintain, in association with the flow identifier, a compression algorithm, such as MPEG4, used to compress the associated data, and miscellaneous program-related information, such as a program date and a program start time or stop time.

In addition to the flow identifier, subscription keys, compression algorithm, and miscellaneous program-related information, in one embodiment of the present invention at least one memory device 126 of server 122 may further maintain one or more group subscription keys that are assigned by broadcast applications server 122, or by an operator of communication system 100, to all broadcast-multicast flows of a group of one or more broadcast-multicast flows, and are used to encrypt and decrypt any flow in the group. For example, the group subscription key may comprise a Group Broadcast Access Key (GBAK), which is identified by an associated GBAK identifier (GBAK_ID) and which expires at an associated expiration time (GBAK_Expire). Broadcast applications server 122 or the operator of communication system 100 assigns a same group subscription key to each broadcast-multicast flow of a group of related broadcast-multicast flows. Preferably, the broadcast-multicast flows included in each group of related broadcast-multicast flows are grouped together based on a commonality of content, that is, based on determination by the system operator that a subscriber to one flow in a group of flows may be interested in the content of the other flows in the group. For example, a group of broadcast-multicast flows may be related by subject matter, such as sports programming, such as ESPN and Fox Sports, news programming, such as CNN and MSNBC, cultural and science programming, such as the Discovery Channel and Arts and Entertainment (A&E), or adult programming, such as the Playboy Channel and adult programming that may be found on premium channels, such as Showtime. By way of another example, a group of broadcast-multicast flows may be determined to be related based on event type, such as a concert. Those who are of ordinary skill in the art realize that numerous bases exist for grouping together various broadcast-multicast flows and that any such basis may be employed herein without departing from the spirit and scope of the present invention.

When an MS 102-104 subscribes to a broadcast-multicast flow, broadcast applications server 122 conveys to the MS, and the MS receives from the server, a flow identifier, subscription keys, compression algorithm, group subscription keys, and miscellaneous program-related information associated with the flow. The MS stores this received information in at least one memory device 208 of the MS.

Subscriber profile database 128 maintains a mobile identifier (mobile ID) associated with each MS, such as MS 102, subscribing to the services of communication system 100 and further maintains and tracks provisioning and mobility information with respect to each such MS, including registration of the MS when the MS activates in communication system 100. Subscriber profile database 128 further maintains, in association with the mobile ID, a subscriber profile for the MS. The subscriber profile includes capabilities of, and applications supported by, the MS and services, such as a broadcast-multicast service and particular broadcast-multicast flows, delivered by communication system 100 and subscribed to by the MS.

In order to receive a broadcast-multicast flow associated with the broadcast-multicast service provided by communication system 100, a user of an MS 102-104 must subscribe to the service and the flow. In order to permit the user of the MS to determine whether to subscribe to the flow, it is desirable to permit the user to sample, for example, to preview, content of the broadcast-multicast flow. In the prior art, in order to permit the user to sample the content of the flow, the user must either be provided the subscription keys that permit decryption of the flow or the user must be provided a sample, such as a preview, of the flow in an unencrypted format. However, the former amounts to a giving away of a free subscription to the broadcast-multicast flow while the latter results in a relinquishment of control over who may view the preview, with the result that the preview may be viewed by an undesired audience, such as underage viewers viewing previews comprising, or associated with, adult content. If the subscription keys are given short expiry timer values in order to reduce the duration of the free subscription, significant overhead is introduced to communication system 100 in the form of increased messaging to distribute the frequently expiring subscription keys to all of the subscribing mobiles.

To overcome these problems, communication system 100 provides for a distribution of different sets of subscription keys with respect to a first version of a broadcast-multicast flow, that is, a subscriber-only version of the flow, that is intended only for subscribers to the flow, that is, subscribed MSs, and a second version of the broadcast-multicast flow, that is, a non-subscriber version of the flow, that is intended for one or more non-subscribers to the flow, that is, non-subscribed MSs, as well as possibly the subscribers to the flow. A first set of subscription keys is distributed only to subscribers to the broadcast-multicast flow and is used to encrypt and decrypt the subscriber-only version of the flow. A second set of subscription keys is distributed to one or more non-subscribers to the broadcast-multicast flow and is used to encrypt and decrypt the non-subscriber version of the flow. In one embodiment of the present invention, the non-subscriber version of a broadcast-multicast flow may be a different flow from the subscriber-only version of the flow, for example, a preview of the flow that is separate from the main flow or separate copies of the same flow. In another embodiment of the present invention, the non-subscriber version of a broadcast-multicast flow and the subscriber-only version of the flow may just be different portions within a same broadcast-multicast flow, for example, a first two minutes of a flow being a non-subscriber version of the flow and a remainder of the flow being a subscriber-only version of the flow. In order to avoid transmitting two versions of a broadcast-multicast flow simultaneously, the second set of subscription keys for the non-subscriber version of the broadcast-multicast flow may be distributed to subscribers to the flow as well as to non-subscribers to the flow, so that both subscribers and one or more non-subscribers can receive and render the same flow.

Figure 3:
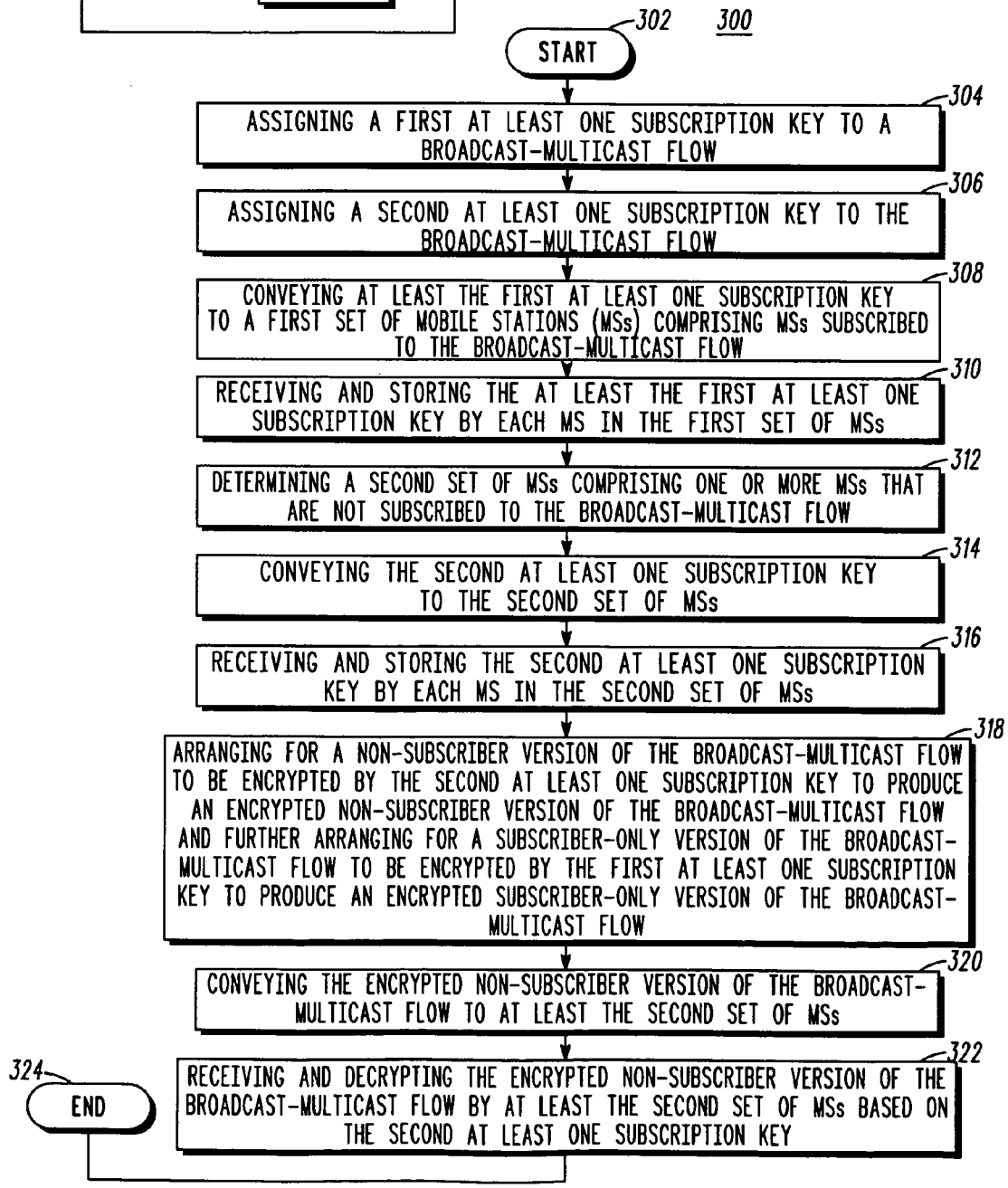
FIG. 3 is a logic flow diagram of a method by which the communication system of FIG. 1 regulates the delivery of a non-subscriber version of a broadcast-multicast flow in accordance with an embodiment of the present invention.

Referring now to FIG. 3, a logic flow diagram 300 is depicted that illustrates a method by which communication system 100 controls a delivery of a non-subscriber version of a broadcast-multicast flow in accordance with an embodiment of the present invention. Logic flow diagram 300 begins (302) when communication system 100, and in particular broadcast applications server 122, assigns (304) a first at least one subscription key to the broadcast-multicast flow. The first at least one subscription key may be used to encrypt/decrypt the audio, video, and/or data associated with the broadcast-multicast flow and preferably comprises a first Broadcast Access Key (BAK), which is associated with a flow identifier and identified by a first BAK identifier (BCMCS_FLOW_ID, BAK_ID) and which expires at an associated first expiration time (BAK_Expire).

Communication system 100, and in particular broadcast applications server 122, further assigns (306) a second at least one subscription key to the broadcast-multicast flow. Both the first and second at least one subscription keys are maintained in association with the broadcast-multicast flow in the at least one memory device 126 of broadcast applications server 122. The second at least one subscription key preferably comprises a second Broadcast Access Key (BAK), which is identified by the associated flow identifier and a second BAK identifier (BCMCS_FLOW_ID, BAK_ID), and which expires at an associated second expiration time (BAK_Expire). The second at least one subscription key is different than the first at least one subscription key and may not be used to decrypt data encrypted by the first at least one subscription key. The first at least one subscription key may be assigned to the broadcast-multicast flow at any time prior to broadcast, by broadcast applications server 122, of the flow and need not be assigned to the broadcast-multicast flow prior to the assignment of the second at least one subscription key to the broadcast-multicast flow.

Broadcast application server 122 then conveys (308) at least the first at least one subscription key and an associated key identifier to each MS in a first set of MSs via a gateway, such as gateway 116, and a BS, such as BS 110, serving the MS. The first set of MSs comprise MSs, for example, MS 102, that are subscribers to the broadcast-multicast flow. In one embodiment of the present invention, broadcast application server 122 may convey both the first and second at least one subscription keys, and the associated key identifiers, to each MS in the first set of MSs. In another embodiment of the present invention, broadcast application server 122 may convey the first at least one subscription key and associated key identifier but not the second at least one subscription key and associated key identifier to each MS in the first set of MSs. Upon receiving the at least the first at least one subscription key and associated key identifier, each MS in the first set of MSs stores (310) the at least the first at least one subscription key and key identifier in the at least one memory device 208 of the MS.

Broadcast applications server 122 further determines (312) a second set of MSs, that is, target MSs, for example, MSs 103 and 104, that are not subscribed to the broadcast-multicast flow and that the broadcast application server or the system operator believes, for any reason, may be enticed to subscribe to the broadcast-multicast flow. For example, the target MSs may subscribe to other broadcast-multicast flows that are related to the broadcast-multicast flow in terms of subject matter. For example, the broadcast-multicast flow may be a sports program, such as ESPN, and the target MSs may subscribe to other sports programming, such as Fox Sports, or the broadcast-multicast flow may be a news program, such as CNN, and the target MSs may subscribe to other news programming, such as MSNBC. By way of another example, the target MSs may subscribe to other broadcast-multicast flows that are related to the broadcast-multicast flow in terms of event type, such as a music concert. By way of yet another example, the target MSs may not be subscribed to any broadcast-multicast flow but may merely be capable of broadcast-multicast reception, such as MSs associated with all adult users in communication system 100 or, more simply, MSs associated with all users in communication system 100. Those who are of ordinary skill in the art realize that numerous bases exist for determined related broadcast flows or for targeting a group of users and that any such basis may be employed herein without departing from the spirit and scope of the present invention.

Broadcast application server 122 conveys (314) the second at least one subscription key and an associated key identifier to each MS 103, 104 in the second set of MSs, that it, the target MSs. The second at least one subscription key and associated key identifier may be conveyed to each target MS 103, 104 in an unencrypted or an encrypted format. The broadcast application server conveys the second at least one subscription key and key identifier to each target MS via a gateway, such as gateway 116, and a BS, such as BS 110, serving the MS. Upon receiving the second at least one subscription key and associated key identifier, each target MS 103, 104 stores (316) the second at least one subscription key and key identifier in the at least one memory device 208 of the MS.

When network 132 receives data associated with the broadcast-multicast flow, broadcast applications server 122 arranges (318) for a portion of the data, that is, a non-subscriber version of the flow, to be encrypted by the second at least one subscription key to produce an encrypted non-subscriber version of the broadcast-multicast flow. Broadcast applications server 122 further arranges for another portion of the data, that is, a subscriber-only version of the flow, to be encrypted by the first at least one subscription key to produce an encrypted subscriber-only version of the broadcast-multicast flow. For example, when broadcast applications server 122 comprises a BCMCS Controller in communication with a BCMCS Content Server and the BCMCS Content Server receives BCMCS data associated with the flow, the BCMCS Controller instructs the BCMCS Content Server to encrypt a portion of the data using the second at least one subscription key to produce an encrypted, non-subscriber version of the broadcast-multicast flow and further instructs the BCMCS Content Server to encrypt a portion of the data using the first at least one subscription key to produce an encrypted subscriber-only version of the broadcast-multicast flow. By referring to the encrypted data as a non-subscriber version of the broadcast-multicast flow, it is merely meant that the encrypted data may be received and decrypted by the target MSs 103, 104 that are not subscribed to the flow. Depending upon the whether the second at least one subscription key has been distributed to the first set of MSs, each MS in the first set of MSs may or may not be capable of decrypting the encrypted non-subscriber version of the broadcast-multicast flow. The two portions may be two different broadcast-multicast flows that are each encrypted with a different set of keys, for example, a preview of the flow and a main version of the flow or two separate copies of the flow, or the two portions may be separate, in time, portions of a same flow, where a single flow is encrypted at different times with different keys.

Broadcast applications server 122 then broadcasts (320) the encrypted non-subscriber version of the broadcast-multicast flow to at least the second set of MSs, that is, MSs 103 and 104, and preferably each of the first and second set of MSs, that is, MSs 102-104, via a gateway, that is, gateway 116, and a BS, that is, BS 110, serving each MS. Each MS maintaining the second at least one subscription key may then decrypt (322) the received broadcast audio, video, and/or data using the provided second at least one subscription key. The MS may then store the decrypted audio, video, and/or data in at least one memory device 208 of the MS or may render the audio, video, and/or data to the user of the MS via the user interface 210 of the MS. Logic flow 300 then ends (324).

Preferably, broadcast applications server 122 broadcasts the encrypted non-subscriber version of the broadcast-multicast flow via encrypted data packets and using Secure Real-time Transport Protocol (SRTP). Each SRTP data packet includes a data field that identifies a BAK_ID. An MS receiving the packet may then use the BAK associated with the BAK_ID to decrypt the packet. As a result, when a non-subscriber version of a broadcast-multicast flow preview is being broadcast, communication system 100 does not have to inform the recipients of the non-subscriber version of the flow when the non-subscriber version starts or ends. Broadcast application server 122 merely has to tell the MS is that there is preview enabled and convey the first at least one subscription key, for example, a BAK, and a key identifier, for example, a BAK_ID, to subscribers and further convey the second at least one subscription key, for example, a different BAK, and another BAK_ID to non-subscribers (and possible to subscribers as well). When the non-subscriber version of a broadcast-multicast flow is transmitted, each data packet includes an identifier associated with the second at least one subscription key, for example, a BAK_ID, in one of its data fields. An MS receiving the packet is then able to determine a BAK to use to decrypt the packet based on the included BAK_ID. When the subscriber-only version of a broadcast-multicast flow is transmitted, preferably also in the format of encrypted SRTP data packets, each such packet also includes an identifier associated the first at least one subscription key, such as a different BAK_ID. An MS receiving the packet is then able to determine an appropriate BAK to use to decrypt the packet based on the included BAK_ID. While all MSs in communication system 100 may be able to receive a non-subscriber version or a subscriber-only version of a broadcast-multicast flow, only the MSs maintaining the subscription key identifier included in the received data packets can decrypt the content of the packets.

In one embodiment of the present invention, the non-subscriber version of the broadcast-multicast flow may comprise a time-based preview of the broadcast-multicast flow. For example, broadcast applications server 122 may arrange for the broadcast-multicast flow to be encrypted by the second at least one subscription key, instead of the first at least one subscription key, for an initial, limited period of time associated with delivery of the flow, such as a first few minutes of the flow. In such an embodiment, in order for the subscribed MSs, that is, the first set of MSs, to receive the complete broadcast-multicast flow, the second at least one subscription key and associated key identifier must be distributed to each MS in the first set of MSs at step 308. Since both the first set of MSs, that is, the subscribed MSs, and second set of MSs, that is, the target, non-subscribed MSs, maintain the second at least one subscription key, both the subscribed MSs and the target, non-subscribed MSs are capable of decrypting the encrypted non-subscriber version of the broadcast-multicast flow.

Upon expiration of the initial, limited period of time, broadcast applications server 122 arranges for a switch of encryption keys used to encrypt the broadcast-multicast flow, that is, for the data to be encrypted by the first at least one subscription key instead of the second at least one subscription key, thereby producing a subscriber-only version of the flow. Since the first at least one subscription key is maintained only by the subscribed MSs in the first set of MSs and by MSs in the second set of MS that determine, as described below, to subscribe to the flow, only subscribed MSs are then capable of decrypting the subscriber-only version of the flow. By way of another example, broadcast applications server 122 may periodically or intermittently arrange for the broadcast-multicast flow to be encrypted by the second at least one subscription key for a predetermined period of time to produce a periodic or intermittent encrypted non-subscriber version of the broadcast-multicast flow. Otherwise, the broadcast-multicast flow is encrypted by the first at least one subscription key to produce a subscriber-only version of the flow.

In another embodiment of the present invention, the non-subscriber version of the flow may comprise a preview that is received from a BM content provider 136, 138 separate from the associated broadcast-multicast flow. In such an embodiment, the second at least one subscription key and associated key identifier may or may not be distributed to each MS in the first set of MSs at step 308, depending upon whether the operator of communication system 100 wishes the first set of MSs to be capable of viewing previews of flows to which they are subscribed. In response to receiving the preview, broadcast applications server 122 has the data encrypted using the second at least one subscription key to produce an encrypted preview and broadcasts the encrypted preview. Each MS maintaining the second at least one subscription key may then decrypt the broadcast audio, video, and/or data using the provided second at least one subscription key and display the audio, video, and/or data to the user of the MS via user interface 210.

In yet another embodiment of the present invention, the non-subscriber version of the flow may comprise a partial copy of the broadcast-multicast flow. In such an embodiment, in response to receiving the broadcast-multicast flow from a BM content provider 136, 138, broadcast applications server 122 may create two versions of the flow by having a first copy of the flow encrypted using the first at least one subscription key to produce an encrypted subscriber-only version of the flow and having a second, partial copy of the flow encrypted using the second at least one subscription key to produce an encrypted non-subscriber version of the flow. For example, the second, partial copy of the flow may be a time-limited version of the flow, such as a copy of the first several minutes of the flow. In one such embodiment of the present invention, only the first at least one subscription key may be distributed to each MS in the first set of MSs at step 308. Broadcast applications server 122 then conveys the encrypted subscriber-only version of the flow to each MS in the first set of MSs via a gateway and BS serving each such MS. Broadcast applications server 122 further conveys the encrypted non-subscriber version of the flow each MS in the second set of MSs, that is, the target MS, via a gateway and BS serving each such target MS. The encrypted subscriber-only version of the flow may be decrypted only by MSs that have received, and stored, the first at least one subscription key and the encrypted non-subscriber version of the flow then may be decrypted only by MSs that have received, and stored, the second at least one subscription key.

Figure 4:
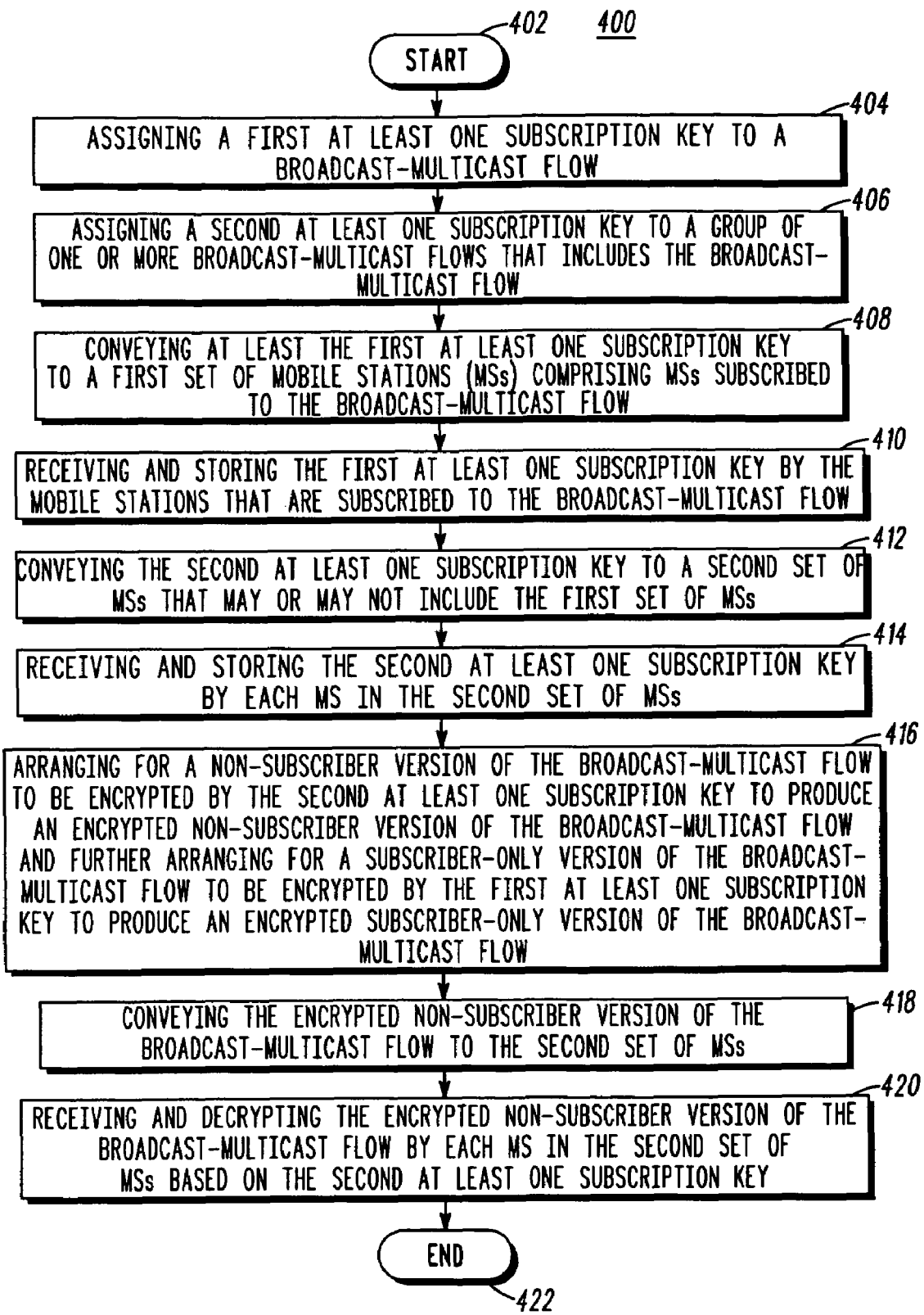
FIG. 4 is a logic flow diagram of a method by which the communication system of FIG. 1 regulates the delivery of a non-subscriber version of a broadcast-multicast flow in accordance with another embodiment of the present invention.

In still another embodiment of the present invention, the second at least one subscription key may be a group key that is assigned to all broadcast-multicast flows in a group of related broadcast-multicast flows. The second at least one subscription key may then be used to encrypt/decrypt a non-subscriber version of each and every broadcast-multicast flow in the group of broadcast-multicast flows. Referring now to FIG. 4, a logic flow diagram 400 is depicted of a method by which communication system 100 uses a group key to control a delivery of a non-subscriber version of a broadcast-multicast flow in accordance with such an embodiment of the present invention.

Logic flow diagram 400 begins (402) when communication system 100, and in particular broadcast applications server 122, assigns (404) a first at least one subscription key to a broadcast-multicast flow, which first at least one subscription key is maintained in association with the broadcast-multicast flow in the at least one memory device 126 of broadcast applications server 122. The first at least one subscription key may be used to encrypt/decrypt the audio, video, and/or data associated with the broadcast-multicast flow only and preferably comprises a first Broadcast Access Key (BAK), which is associated with a flow identifier and identified by a first BAK identifier (BCMCS_FLOW_ID, BAK_ID) and which expires at an associated first expiration time (BAK_Expire). Communication system 100, and in particular broadcast applications server 122, further assigns (406) a second at least one subscription key to the group of related broadcast-multicast flows that includes the broadcast-multicast flow associated with the first at least one subscription key, which second at least one subscription key is maintained in at least one memory device 126 of broadcast applications server 122 in association with each broadcast-multicast flow in the group of broadcast-multicast flows. As described in detail above, the group of broadcast-multicast flows may be determined on any basis of commonality that the broadcast application server or the system operator believes may be relevant with respect to enticing MSs to subscribe to a flow in the group. The second at least one subscription key preferably comprises a Group Broadcast Access Key (GBAK), which is identified by an associated GBAK identifier (GBAK_ID) and which expires at an associated GBAK expiration time (GBAK_Expire). The second at least one subscription key may be used to encrypt/decrypt the audio, video, and/or data associated with a non-subscriber version of any broadcast-multicast flow in the group of broadcast-multicast flows. Again, the second at least one subscription key is different than the first at least one subscription key, may not be used to decrypt data encrypted by the first at least one subscription key, and may be assigned prior to or after assignment of the second at least one subscription key.

Broadcast application server 122 conveys (408) the first at least one subscription key and an associated key identifier to each MS, such as MS 102, in a first set of MSs via a gateway, such as gateway 116, and a BS, such as BS 110, serving the MS. Preferably, each MS in the first set of MS is a subscriber to the broadcast-multicast flow. Upon receiving the first at least one subscription key and associated key identifier, each MS in the first set of MS, that is, each subscribed MS, stores (410) the first at least one subscription key and key identifier in the at least one memory device 208 of the MS.

Broadcast application server 122 further conveys (412) the second at least one subscription key, that is, the group subscription key(s), and associated key identifier(s) to each MS, such as MSs 102-104, in a second set of MSs via a gateway, such as gateway 116, and a BS, such as BS 110, serving the MS. In one embodiment of the present invention, the second set of MSs may comprise MSs subscribed to any broadcast-multicast flow of the group of broadcast-multicast flows and include the first set of MSs. For example, MSs 103 and 104 may each be subscribed to a broadcast-multicast flow that is different from, but in some way related to, such as by subject matter or event type, the broadcast-multicast flow subscribed to by MS 102. In another embodiment of the present invention, the second set of MSs may comprise one or more MSs that may or may not be subscribed to any broadcast-multicast flow of the group but that are capable of broadcast-multicast reception, such as all adult users in communication system 100 or, more simply, all users in communication system 100. In yet another embodiment of the invention, the second set of MSs may comprise MSs subscribed to any broadcast-multicast flow of the group of broadcast-multicast flows and additionally comprise MSs that are not subscribed to any broadcast-multicast flow of the group but that are capable of broadcast-multicast reception.

Upon receiving the group subscription key(s) and associated key identifier, each MS 102-104 in the second set of MSs stores (414) the group subscription key(s) and key identifier in the at least one memory device 208 of the MS. For example, when an MS 102-104 subscribes to any broadcast-multicast flow in the group of broadcast-multicast flows, broadcast applications server 122 may convey to the MS, and the MS may receive from the server, a flow identifier and a first subscription key associated with the flow, a compression algorithm and miscellaneous program-related information associated with the flow, and a group identifier and group subscription key(s) associated with a group of flows to which this flow belongs. The MS stores this received information in at least one memory device 208 of the MS.

When network 132 receives data associated with the broadcast-multicast flow, the broadcast applications server 122 arranges (416) for a portion of the data to be encrypted by the group subscription key to produce an encrypted non-subscriber version of the broadcast-multicast flow and further arranges for another portion of the data to be encrypted by the first at least one subscription key to produce an encrypted subscriber-only version of the broadcast-multicast flow. The encrypted non-subscriber version of the broadcast-multicast flow is a non-subscriber version in the sense that the encrypted data may be received and decrypted by MSs not subscribed to the received broadcast-multicast flow, such as MSs 103 and 104, although the non-subscriber version may further be received and decrypted by subscribed MSs as well, such as MS 102. For example, as described in detail above, the encrypted, non-subscriber version of the broadcast-multicast flow may comprise a time-based preview of the broadcast-multicast flow that is being made available to non-subscribers to the flow.

Broadcast applications server 122 then conveys (418) the encrypted non-subscriber version of the broadcast-multicast flow to each MS, such as MSs 102-104, in the second set of MSs via a gateway, that is, gateway 116, and a BS, that is, BS 110, serving the MS. Each such MS 102-104 may then decrypt (420) the received broadcast audio, video, and/or data using the second at least one subscription key, that is, the group subscription key(s), maintained by the MS. The MS may then store the decrypted audio, video, and/or data in at least one memory device 208 of the MS or may render the audio, video, and/or data to the user of the MS via the user interface 210 of the MS. Logic flow 400 then ends (422).

Similar to logic flow diagram 300, preferably broadcast applications server 122 broadcasts the encrypted non-subscriber version of the broadcast-multicast flow via encrypted data packets and using Secure Real-time Transport Protocol (SRTP). Each SRTP data packet includes a data field that identifies a BAK_ID or a GBAK_ID. An MS receiving the packet may then use the BAK or GBAK respectively associated with the BAK_ID or GBAK_ID to decrypt the packet. That is, when the non-subscriber version of a broadcast-multicast flow is transmitted, each data packet includes an identifier associated with the second at least one subscription key, for example, a GBAK_ID, in one of its data fields. An MS receiving the packet is then able to determine a GBAK to use to decrypt the packet based on the included GBAK_ID. When the subscriber-only version of a broadcast-multicast flow is transmitted, preferably also in the format of encrypted SRTP data packets, each such packet also includes an identifier associated the first at least one subscription key, such as a BAK_ID. An MS receiving the packet is then able to determine a BAK to use to decrypt the packet based on the included BAK_ID.

Figure 5:
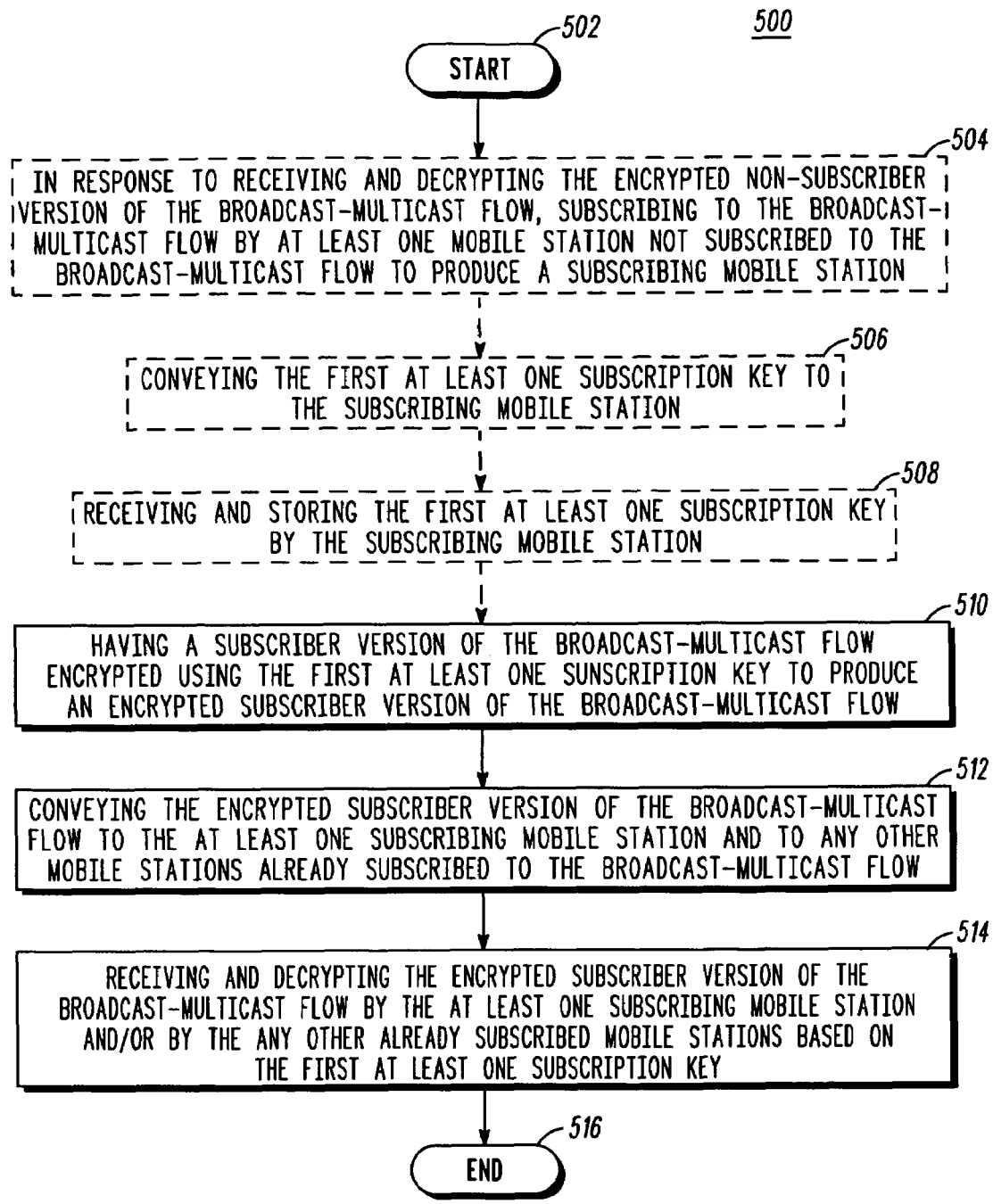
FIG. 5 is a logic flow diagram of a method by which the communication system of FIG. 1 regulates the delivery of a subscriber version of a broadcast-multicast flow in accordance with an embodiment of the present invention.

Referring now to FIG. 5, a logic flow diagram 500 is depicted whereby communication system 100 provides for delivery of the subscriber-only version of the broadcast-multicast flow using the first at least one subscription key. Logic flow diagram 500 begins (502) when, in response to receiving and decrypting the non-subscriber version of the broadcast-multicast flow, a user of a non-subscribing MS, such as MS 103 or 104, may then subscribe (504) to the broadcast-multicast flow. Typically, a user of an MS, such as MSs 103 and 104, may subscribe to a broadcast-multicast flow by conveying to the communication system, and in particular to gateway 116 or to broadcast application server 122 via the gateway, a request to register for, or subscribe to, the flow, which request indicates a willingness to receive broadcast-multicast service data associated with the flow. The request includes the flow identifier associated with the flow, thereby informing server 122 of the flow being registered for.

In response to receiving a request to register for the broadcast-multicast flow from an MS, such as MS 102, or from a gateway, such as gateway 116, broadcast application server 122 stores an identifier associated with the gateway, the served BS, and/or the subscribing MS, in the one or more memory devices 126 of the server. Broadcast application server 122 may further retrieve the subscriber profile associated with the MS from subscriber profile database 128 and may set up an accounting record with an accounting system, such as an Authentication, Authorization, Accounting entity (AAA) (not shown), in order to bill the MS for provision of the service. Alternatively, the accounting may be done at gateway 116.

In addition, in response to receiving the registration request, broadcast application server 122 conveys (506) to the subscribing MS and the subscribing MS receives (508) from the server, via the gateway serving the MS, a flow identifier, for example, BCMCS_FLOW_ID, and the first at least one subscription key, for example, BAK, and an associated key identifier, for example, BAK_ID, associated with the broadcast-multicast flow. The subscribing MS stores the received flow identifier in the at least one memory device 208 of the MS and further stores, in the at least one memory device, the first at least one subscription key and associated key identifier in association with the flow identifier. Broadcast application server 122 further conveys to the MS information that may be used by the MS to receive, decode, and display the data associated the broadcast-multicast flow, such as a start time of the flow, decoding information such as an indicator of a compression algorithm, for example, MPEG4, used to compress the data. In addition, broadcast application server 122 may further convey to the MS any group subscription keys, that is, second at least one subscription key, and associated key identifiers that are associated with the flow. The MS stores the received identifiers, keys, algorithm and other decoding information, and programming information in the at least one memory device 208 of the MS and uses the first at least one subscription key to decrypt and display the subscriber-only version of the broadcast-multicast flow on a user interface 210 of the MS.

When network 132 receives data associated with the broadcast-multicast flow from a broadcast-multicast content provider 136, 138, broadcast application server 122 arranges (510) for at least a portion of the data to be encrypted using the first at least one subscription key to produce an encrypted subscriber-only version of the broadcast-multicast flow. Broadcast application server 122 conveys (512) the encrypted subscriber-only version of the broadcast-multicast flow to the subscribed MSs via a BS servicing the MS, which BS transmits the data by broadcasting or multicasting the data via a bearer channel of an associated air interface downlink, that is, downlink 107. Each subscribed MS may then decrypt (514) the received audio, video, and/or data using the provided first at least one subscription key and display the audio, video, and/or data to the user of the MS via user interface 210. Logic flow diagram 500 then ends (516).

Similar to logic flow diagrams 300 and 400, preferably broadcast applications server 122 broadcasts the encrypted subscriber-only version of the broadcast-multicast flow via encrypted SRTP data packets. Each SRTP data packet includes a data field that identifies a BAK_ID. An MS receiving the packet may then use the BAK associated with the BAK_ID to decrypt the packet.

By providing separate subscription keys for a non-subscriber version of a broadcast-multicast flow and a subscriber-only version of the flow, communication system 100 allows MSs to sample the contents of the flow without giving away a free subscription to the flow and while retaining control over who may view the sample. In one embodiment of the present invention, communication system 100 assigns the separate subscription keys to a same broadcast-multicast flow. The communication system may then switch the keys used to encrypt the flow, or may use different keys to encrypt different copies of the flow, in order to allow non-subscribers, and possibly subscribers, to view one version of the flow and only subscribers to view another version of the flow. In another embodiment of the present invention, communication system 100 may assign a group subscription key to a group of broadcast-multicast flows that is separate from the keys assigned to each individual flow in the group of flows. The group subscription key may then be used to encrypt a non-subscriber version of any broadcast-multicast flow in the group of broadcast-multicast flows, thereby allowing any MS targeted to receive the non-subscriber version of the flow to store or render the non-subscriber version of the flow while not allowing such an MS to store or render any subscriber-only version of a broadcast-multicast flow in the group of broadcast-multicast flows (other than the flow(s) subscribed to by the MS).

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for distributing subscription keys associated with a broadcast-multicast flow comprising:

conveying a first at least one subscription key associated with a broadcast-multicast flow to a first set of mobile stations; and conveying a second at least one subscription key associated with the broadcast-multicast flow to a second set of mobile stations, wherein the second at least one subscription key is different than the first at least one subscription key, the second set of mobile stations is different than the first set of mobile stations, the first at least one subscription key and the second at least one subscription key are each used to encrypt the broadcast-multicast flow, the first at least one subscription key is used to create a first encrypted version of the broadcast-multicast flow, the second at least one subscription key is used to create a second encrypted version of the broadcast-multicast flow that is different than the first encrypted version, the first set of mobile stations comprises only subscribers to the broadcast-multicast flow, the second set of mobile stations comprises non-subscribers to the broadcast-multicast flow, and neither the first encrypted version of the broadcast-multicast flow nor the second encrypted version of the broadcast-multicast flow can be viewed by mobile stations not in possession of the first at least one subscription key or the second at least one subscription key.

2. The method of claim 1, wherein the second set of mobile stations further comprises subscribers to the broadcast-multicast flow.

3. The method of claim 1, further comprising using the second at least one subscription key to decrypt the second encrypted version of the broadcast-multicast flow.

4. The method of claim 1, wherein the first at least one subscription key is a first Broadcast Access Key (BAK) and wherein the second at least one subscription key is a second BAK.

5. The method of claim 1, wherein the second at least one subscription key associated with the broadcast-multicast flow is further associated with other broadcast-multicast flows from a group of broadcast-multicast flows.

6. The method of claim 5, wherein the second set of mobile stations comprises subscribers to any one or more broadcast-multicast flows of the group of broadcast-multicast flows.

7. The method of claim 6, wherein the second set of mobile stations comprises one or more mobile stations that are not subscribed to any broadcast-multicast flow in the group of broadcast-multicast flows.

8. The method of claim 1, further comprising:
encrypting a subscriber-only version of broadcast-multicast flow using the first at least one subscription key to produce an encrypted subscriber-only version of the broadcast-multicast flow;
conveying the encrypted subscriber-only version of the broadcast-multicast flow;
encrypting a non-subscriber version of the broadcast-multicast flow using the second at least one subscription key to produce an encrypted non-subscriber version broadcast-multicast flow; and
conveying the second encrypted broadcast-multicast flow.

9. The method of claim 8, further comprising determining a group of one or more broadcast-multicast flows and wherein the second at least one subscription key is associated with each broadcast-multicast flow in the group of broadcast-multicast flows.

10. A method for providing a broadcast-multicast service comprising:
receiving an encrypted subscriber-only broadcast-multicast flow, wherein the encrypted subscriber-only broadcast-multicast flow is encrypted using a first subscription key;
receiving an encrypted non-subscriber version of the broadcast-multicast flow, wherein the encrypted non-subscriber version of the broadcast-multicast flow is encrypted using a second subscription key;
storing the second subscription key associated with the non-subscriber version of the broadcast-multicast flow; and
decrypting the encrypted non-subscriber version of the broadcast-multicast flow using the second subscription key, wherein the second subscription key cannot be used to decrypt the encrypted subscriber-only version of the broadcast-multicast flow and wherein the broadcast-multicast flow cannot be rendered without application of a key.

11. The method of claim 10, wherein the method further comprises:
rendering the decrypted non-subscriber version of the broadcast-multicast flow;
in response to rendering the decrypted non-subscriber version of the broadcast-multicast flow, conveying a request to subscribe to the broadcast-multicast flow; and
receiving a first at least one subscription key that may be used to decrypt the encrypted subscriber-only version of the broadcast-multicast flow.

12. A broadcast applications server comprising an at least one memory device that maintains a first at least one subscription key and a second at least one subscription key in association with a broadcast-multicast flow, wherein the first at least one subscription key is used to encrypt the broadcast-multicast flow to produce an encrypted subscriber-only version of the broadcast-multicast flow and the second at least one subscription key is used to encrypt the broadcast-multicast flow to produce an encrypted non-subscriber version of the broadcast-multicast flow, wherein the encrypted subscriber-only version of the broadcast-multicast flow is different than the encrypted non-subscriber version of the broadcast-multicast flow, and wherein neither the encrypted subscriber-only version of the broadcast-multicast flow nor the encrypted non-subscriber version of the broadcast-multicast flow can be viewed by mobile stations not in possession of the first at least one subscription key or the second at least one subscription key.

13. The broadcast applications server of claim 12, wherein the non-subscriber version of the broadcast-multicast flow comprises a preview of the broadcast-multicast flow.

14. The broadcast applications server of claim 12, wherein the first at least one subscription key is a first Broadcast Access Key (BAK) and wherein the second at least one subscription key is a second BAK.

15. The broadcast applications server of claim 12, wherein the server further comprises a processor that determines a group of broadcast-multicast flows and wherein the second at least one subscription key is further associated with other broadcast-multicast flows from the group of broadcast-multicast flows.

16. The broadcast applications server of claim 12, wherein the server further comprises a processor that has the subscriber-only version of the broadcast-multicast flow encrypted using the first at least one subscription key to produce an encrypted subscriber-only version of the broadcast-multicast flow, and has the non-subscriber version of the broadcast-multicast flow encrypted using the second at least one subscription key to produce an encrypted non-subscriber version of the broadcast-multicast flow.

17. The broadcast applications server of claim 16, wherein the processor further conveys the encrypted non-subscriber version of the broadcast-multicast flow and, in response to conveying the encrypted non-subscriber version of the broadcast-multicast flow, receives a request to subscribe to the associated broadcast-multicast flow.

18. The broadcast applications server of claim 17, wherein the processor, in response to receiving a request to subscribe to the associated broadcast-multicast flow, conveys the first at least one subscription key.

19. The broadcast applications server of claim 16, wherein the processor further determines a group of broadcast-multicast flows and wherein the second at least one subscription key is associated with each broadcast-multicast flow of the group of broadcast-multicast flows.

20. The broadcast applications server of claim 19, wherein the processor further arranges for a non-subscriber version of any broadcast-multicast flow of the group of broadcast-multicast flows to be encrypted using the second at least one subscription key.

21. A mobile station comprising a processor that receives an encrypted non-subscriber version of a broadcast-multicast flow that is encrypted using a second subscription key, receives the second subscription key, decrypts the encrypted non-subscriber version of the broadcast-multicast flow using the second subscription key to produce a decrypted non-subscriber version of the broadcast-multicast flow, and renders the decrypted non-subscriber version of the broadcast-multicast flow, wherein the second subscription key cannot be used to decrypt an encrypted subscriber-only version of the broadcast-multicast flow that is encrypted using a first subscription key and wherein the broadcast-multicast flow cannot be rendered without application of a key.

22. The mobile station of claim 21, wherein the processor, in response to displaying the decrypted non-subscriber version of the broadcast-multicast flow, conveys a request to subscribe to the broadcast-multicast flow and receives the first subscription key that may be used to decrypt the encrypted subscriber-only version of the broadcast-multicast flow.

* * * * *